(12) United States Patent
Marsden (10) Patent No.: US 7,340,123 B1
(45) Date of Patent: Mar. 4, 2008

(54) OPTICAL MULTIPLEXER AND DEMULTIPLEXER SYSTEMS AND METHODS USING INTERFERENCE FILTERS

(75) Inventor: Gary C. Marsden, Austin, TX (US)

(73) Assignee: Finisar Corporation, Sunnyvale, CA (US)

( * ) Notice: Subject to any disclaimer, the term of this patent is extended or adjusted under 35 U.S.C. 154(b) by 187 days.

(21) Appl. No.: 10/684,007

(22) Filed: Oct. 10, 2003

Related U.S. Application Data (60) Provisional application No. 60/417,793, filed on Oct. 11, 2002.

(51) Int. Cl.
*G02B 6/26* (2006.01)
*G02B 6/42* (2006.01)

(52) U.S. Cl. .......................... 385/15; 385/16
(58) Field of Classification Search .................. 385/15
See application file for complete search history.

(56) References Cited

U.S. PATENT DOCUMENTS

| | | | |
|---|---|---|---|
| 3,699,454 A * | 10/1972 | Hudspeth et al. ........... 455/208 |
| 5,548,608 A * | 8/1996 | Zhang ........................ 372/75 |
| 5,778,114 A * | 7/1998 | Eslambolchi et al. ......... 385/12 |
| 5,778,118 A * | 7/1998 | Sridhar ...................... 385/24 |
| 5,778,132 A * | 7/1998 | Csipkes et al. ............. 385/135 |
| 6,208,444 B1 | 3/2001 | Wong et al. ................ 359/127 |
| 7,075,712 B2 * | 7/2006 | Kinoshita et al. ........... 359/649 |
| 2002/0024706 A1 * | 2/2002 | Meli .......................... 359/173 |

* cited by examiner

*Primary Examiner*—Frank G. Font
*Assistant Examiner*—Mary El-Shammaa
(74) *Attorney, Agent, or Firm*—Workman Nydegger (57) ABSTRACT

Multiple channel multiplexing and demultiplexing systems and methods are provided for use in optical communication systems. In one embodiment, an optical multiplexer/demultiplexer system comprises an optical filter, a first optical isolator in optical communication with one side of the optical filter, a second optical isolator in optical communication with an opposite side of the optical filter, and a light disposer in optical communication with the first optical isolator. In another embodiment, an optical multiplexer/demultiplexer system comprises a first boundary filter, a first transitional optical filter in optical communication with the first boundary filter, a second boundary filter in optical communication with the first transitional optical filter, a second transitional optical filter in optical communication with the second boundary filter, and a third boundary filter in optical communication with the first transitional optical filter. Various optical filtering techniques are disclosed which utilize filters with shifted free spectral ranges, half-band filters, or boundary filtering. These filtering techniques can be used in both multiplexing and demultiplexing methods.

35 Claims, 6 Drawing Sheets

OPTICAL MULTIPLEXER AND DEMULTIPLEXER SYSTEMS AND METHODS USING INTERFERENCE FILTERS

This application claims the benefit of priority to U.S. Provisional Application No. 60/417,793, filed on Oct. 11, 2002, the disclosure of which is incorporated herein by reference.

BACKGROUND OF THE INVENTION

1. Field of the Invention

The present invention relates generally to optical communication systems. In particular, the invention relates to optical multiplexer/demultiplexer systems that utilize interference filters.

2. Background Technology

It is generally understood that one way to expand the bandwidth of an existing optical fiber is to multiplex many optical signals having slightly different wavelengths into the fiber. Complete wavelength-division multiplexer systems are often composed of simpler multiplexers having two or more optical input signals, each of which may or may not be multiplexed, and a single output optical signal that combines the optical input signals. Similarly, complete demultiplexer systems are often composed of simpler demultiplexers. The simplest multiplexer has two inputs and one output optical signal, while the simplest demultiplexer consists of one input and two output optical signals.

There are performance expectations of wavelength-division multiplexers and demultiplexers that must be considered in their design. First, the devices are expected to work in the presence of frequency drift in the carrier frequencies. For example, the International Telecommunication Union (ITU) has established standards for the frequencies to be used in WDM devices. One standard includes carrier frequencies spaced 100 GHz apart, centered around 194.100 THz. However, the actual frequency of the carrier may drift by as much as 25 GHz. It is therefore required of a WDM device that it work effectively over a passband of 50 to 60 GHz for each channel.

Another requirement is that when demultiplexed, the energy of other channels should be essentially eliminated from a given channel. This is measured by the isolation figure of merit and it typically must be better than −30 dB (0.1%). Because of the nature in which simple demultiplexers are combined to make complete demultiplexers, this figure of merit usually applies to each component as well as to the entire system. The isolation should be achieved across the entire passband of each of the other channels.

Insert loss is the measure of how much energy remains in the output of a device relative to the input. For demultiplexers and multiplexers this should be better than −6 dB (25% retention) and preferably better than −3 dB (50%). Because simple multiplexers or demultiplexers are cascaded together, the insertion loss must be much better for a simple device than for the complete system. The exact value depends on the architecture of the composite multiplexer, which will be discussed below.

Return loss measures the amount of energy that reflects from the device back into the input channel. Because the effects of this reflected energy might disrupt performance in upstream devices, the return loss must be extremely low. Typical values of −40 dB (0.01%) are expected. To guarantee system-level compliance, simple multiplexers and demultiplexers must attain this degree of return loss also.

There are many ways to achieve wavelength-division multiplexing and demultiplexing. Methods include the use of diffraction gratings, Bragg (volume) gratings, and Mach-Zehnder interferometers. Each of these approaches relies on interference physics to separate the very closely spaced frequencies.

Another interference technique involves the use of etalons and multilayer optical interference filters. An etalon consists of two parallel reflecting surfaces and a cavity between them of a very precise length. The etalon transmits an optical frequency only if the cavity length is approximately an integer multiple of one-half of the corresponding wavelength. Other frequencies are reflected from the etalon. It should be noted that an etalon has many transmission peaks and the distance between these peaks when measured in frequency is called the free spectral range, which is inversely proportional to both the cavity length of the etalon and the index of refraction of the material inside the cavity. The passband and isolation of an etalon are a function of the reflectivity of the reflecting surfaces. For applications requiring very narrow passbands and very high isolation, such as spectroscopy, etalons are an ideal device. Unfortunately, simple etalons are not well suited to WDM applications. Etalons with sufficient isolation of the reflected channels do not provide sufficient passbands for the transmitted channels. Conversely, etalons with sufficient passbands do not provide sufficient isolation from the unwanted frequencies.

Use of multilayer interference filters is a way of overcoming this problem. Essentially, multilayer interference filters are cascaded etalon structures. By cascading many etalons, it is possible to achieve both high isolation and sufficient passbands. Multilayer filters, often called stacks, sometimes consist of one hundred or more layers of alternating materials having differing indices of refraction. The interface between any two layers serves as a reflector and the composite effect of many weak etalons is a filter with relatively wide passbands and high isolation. They are therefore good candidates for WDM devices.

However, there are practical considerations of multilayer interference filters that must be considered in the design of WDM devices that incorporate them. First, a single optical filter, by itself, will produce unacceptable isolation or return loss. Consider a typical optical filter that transmits −0.04 dB (99.08%) of the energy in the frequencies intended to be transmitted (hereinafter the even-parity frequencies) and reflects −0.0004 dB (99.9908%) of the energy in the frequencies intended to be reflected (hereinafter the odd-parity frequencies). The insertion loss requirements are clearly met by this filter for both subsets of frequencies. Considering for the moment the demultiplexing case, the isolation of the odd-parity frequencies from the even-parity frequencies is −40 dB, which is quite acceptable. However, the isolation of the even-parity frequencies from the odd-parity frequencies is only −20 dB, which is not acceptable. In the case of multiplexing, these numbers correspond to the return loss and are equally unacceptable. This performance is typical of optical interference filters and must be compensated for in a practical multiplexing or demultiplexing device.

Another practical concern is that the frequency response of an optical interference filter is dependent on the incident angle. For polarization reasons, optical filters are best designed for normal incidence. The free spectral range of the optical filter is inversely proportional to the incident angle. Assuming that the maximal allowable shift of the transmission peak of off-axis components is 10 GHz, the maximum allowable angular deviation is approximately 1 minute for typical WDM frequencies. This imparts a serious constraint on the planarity and parallelism of the layers of an optical interference filter.

The angular constraints imposed by the optical filter also lead to limitations on the degree of miniaturization that can be achieved. Assuming that the incident beam is a collimated Gaussian beam, the divergence angle of the beam is inversely proportional to the beam width. For a divergence angle of 1 minute, the beam diameter must be approximately 5 mm. This assumes that there are no other sources of angular divergence, which in practice may not hold. In practice the beam may be 10 mm or larger to account for other sources of angular deviation.

The chromatic dispersion (the frequency-dependence of the index of refraction) of potential materials to be used in optical interference filters must also be considered. Consider an optical filter designed to have a transmission peak at the central frequency of the ITU frequency grid. This frequency is an integer multiple of the free spectral range of the filter. The free spectral range itself is typically an integer multiple of the ITU grid spacing so that other transmission peaks will align with the grid. However, the free spectral range is inversely related to the index of refraction. It therefore follows that the free spectral range is frequency dependent. If the index of refraction changes at the extremes of the communication band, the free spectral range will no longer be equal to that of the design, resulting in a shift of the transmission peak from its intended position on the ITU grid. The tolerances on dispersion are quite tight. For a 10 GHz allowable shift over a 5000 GHz communication band, centered at 194 THz, the dispersion, as measured by the rate of change of the index of refraction, must be not greater than $4 \times 10^{-8}$/GHz. This rules out many materials commonly used in optical interference filter designs.

In theory it is possible to design an optical filter with very steep transitions from reflection to transmission mode. In practice, there are a limited number of layers that can be deposited accurately. As a result, the transition may not be steep enough to provide all performance measures. For example, suppose a demultiplexer must provide a bandwidth of 50 GHz, measured as the −3 dB transmission point, and −30 dB isolation for a communication system with 100 GHz channel spacing. The transition must therefore be from −3 dB to −30 dB in a 50 GHz band. This may prove difficult for some optical filters.

It is also possible in theory to design optical filters with an arbitrary free spectral range, provided that the transmission peaks are integer multiples of the free spectral range. In practice this is difficult for smaller free spectral ranges since the required thickness of each layer is inversely proportional to the free spectral range. Optical filters with a free spectral range of 200 GHz are very difficult to produce since, even for high indices of refraction, the corresponding thickness is several hundreds of micrometers. It is difficult to produce many repetitive layers of material films to such thicknesses while maintaining the necessary planarity and parallelism required. Materials with high indices can reduce the required thickness but are typically too dispersive to be used across an entire frequency band.

It is also possible to fabricate narrow bandpass filters that have only one transmission peak. These are usually constructed with a cascade of etalons with differing free spectral ranges. In the bandpass filters there is only one frequency that can be integrally divided by the various free spectral ranges. Because these filters function over a small frequency band, they are not prone to the dispersion limitations mentioned above and are therefore easier to fabricate.

Figure 1:
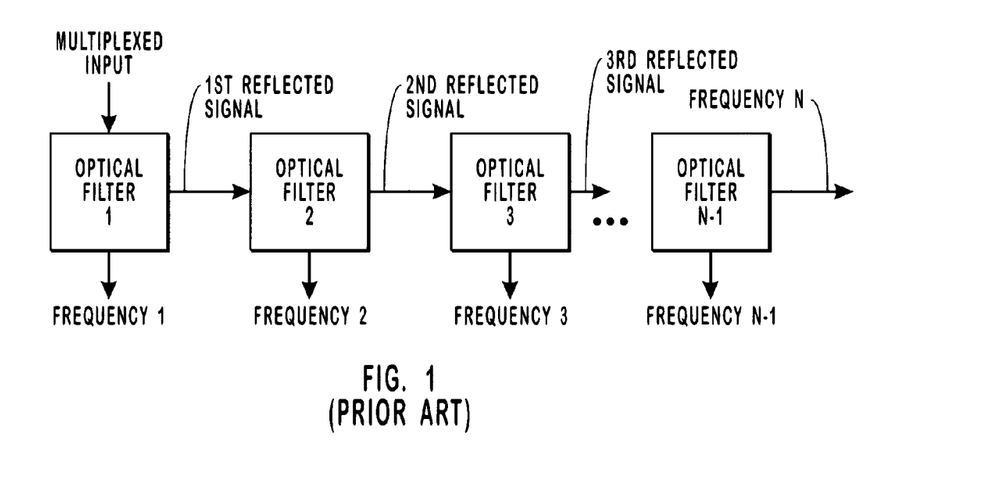
FIG. 1 is a schematic depiction of a conventional demultiplexer system.

One conventional way to couple multiplexers and demultiplexers is shown in FIG. 1 where a series of optical filters 1 through N−1 are arranged in a linear stage. When configured as a demultiplexer, the output of each optical filter stage is a single frequency optical signal 1 though N−1. This technique for filtering signals is disadvantageous because some optical signals must traverse a large number of optical filters, compounding the performance requirements of each stage to unreasonable levels.

Figure 2:
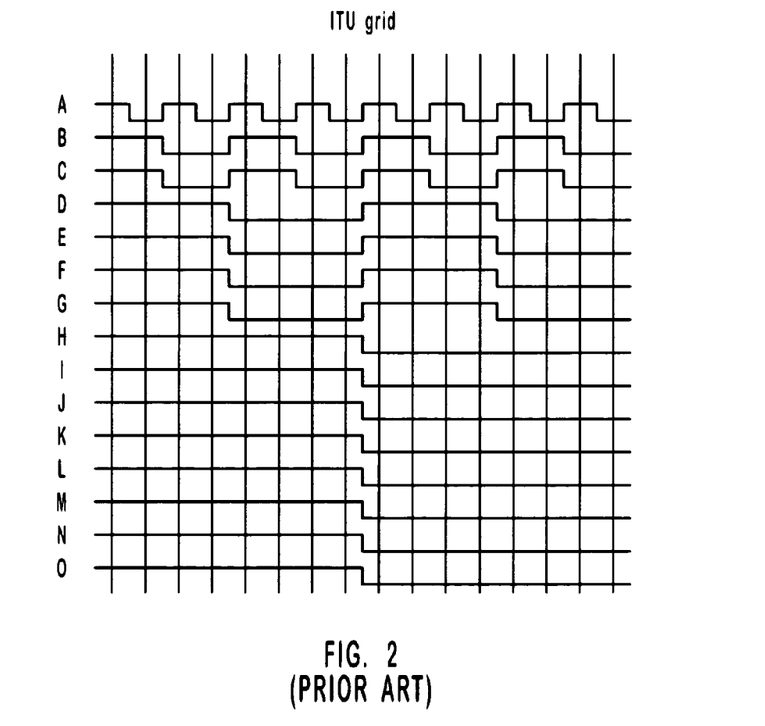
FIG. 2 shows the transmission curves in an ITU grid for a series of filters in a binary tree structure demultiplexer system.

In another conventional approach, a binary tree structure is used to multiplex or demultiplex optical signals. FIG. 2 shows the transmission curves in an ITU grid for this approach for a series of filters A-O. applied to the binary tree structure. If it is assumed that the optical signals reside on the 100 GHz ITU grid, the first stage has a 200 GHz free spectral range filter. In a demultiplexer mode, this stage separates every other frequency, or alternating frequencies, into the odd-parity or even-parity sets. Each subsequent stage has double the free spectral range.

There are several disadvantages with this approach. First, the requirement of the 200 GHz optical filter over the entire communication range hinders practical implementations. Second, the 200 GHz free spectral range leads to impractical thicknesses for the optical layers. Additionally, the need to function over the entire spectral range requires materials with very little dispersion. Combining these requirements limits the available materials that can be used to produce the optical filter. Considering that the optical filter needs to be on the order of 10 mm in diameter, it would be very difficult to obtain high yields with limited material choices.

Accordingly, there is a need for improved multiplexer/demultiplexer devices that avoid or overcome the foregoing difficulties.

SUMMARY OF THE INVENTION

The present invention is directed to multiple channel multiplexing and demultiplexing systems for use in optical communication systems. The multiplexing and demultiplexing systems of the invention are particularly suited for use in wavelength division multiplexing (WDM) systems.

In one embodiment of the invention, an optical multiplexer/demultiplexer system comprises an optical filter, a first optical isolator in optical communication with one side of the optical filter, a second optical isolator in optical communication with an opposite side of the optical filter, and a light disposer in optical communication with the first optical isolator.

In a method of multiplexing optical signals according to the invention, even-parity optical signal channels are introduced to a first side of an optical filter through a first optical isolator, and one or more of the even-parity optical signal channels are transmitted through the optical filter. Odd-parity optical signal channels are introduced to an opposite side of the optical filter through a second optical isolator. One or more of the odd-parity optical signal channels are reflected from the optical filter back to the second optical isolator. The reflected odd-parity optical signal channels are combined with the transmitted even-parity optical signal channels at a multiplexed output.

In another embodiment of the invention, an optical multiplexer/demultiplexer system comprises a first optical filter, a first optical isolator in optical communication with the first optical filter, a second optical isolator in optical communication with the first optical isolator, a second optical filter in optical communication with the second optical isolator, and a light disposer in optical communication with the second optical isolator.

In a method of demultiplexing optical signals according to the invention, multiplexed optical signals are introduced to a first optical filter through a first optical isolator, and one or more even-parity optical signal channels are transmitted through the first optical filter. One or more odd-parity optical signal channels are reflected from the first optical filter back to the first optical isolator. The odd-parity optical signal channels are directed to a second optical filter through a second optical isolator, and the odd-parity optical signal channels are transmitted through the second optical filter.

In a method of multiplexing or demultiplexing optical signals according to the invention, multiplexed optical signals are introduced into a plurality of optical filters arranged in a tree structure, with the filters having nearly identical free spectral ranges but being shifted in frequency.

In a further method of demultiplexing optical signals according to the invention, multiplexed optical signals are introduced to a first optical filter that separates the optical signals into a high frequency signal region and a low frequency signal region. The high frequency signal region is directed to a second optical filter that separates the high frequency signal region into high frequency and low frequency components. The low frequency signal region is directed to a third optical filter that separates the low frequency signal region into high frequency and low frequency components.

In another method of demultiplexing optical signals according to the invention, multiplexed optical channels are introduced to one or more boundary filters that remove channels that fall within a transition region between full transmission and full reflection of a transitional optical filter. The remaining multiplexed optical channels are directed to one or more transitional optical filters that divide the optical channels into high frequency and low frequency signal regions.

Additional systems and methods for multiplexing or demultiplexing are also disclosed hereafter.

These and other features of the present invention will become more fully apparent from the following description and appended claims, or may be learned by the practice of the invention as set forth hereinafter.

BRIEF DESCRIPTION OF THE DRAWINGS

To further illustrate the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

The present invention is directed to multiple channel multiplexing and demultiplexing systems for use in optical communication systems. The multiplexing and demultiplexing systems of the invention are particularly suited for use in wavelength division multiplexing (WDM) systems.

A multiplexer or demultiplexer can operate in either or both directions depending on the direction of travel of light through the device. An optical demultiplexer device demultiplexes, i.e., spatially disburses, multiple wavelength light into separate and different wavelength bands. Similarly, an optical multiplexer combines separate wavelength bands into a single multiple wavelength beam of light. Although, for simplicity and convenience, the demultiplexing or multiplexing functionality of a particular embodiment is discussed hereafter, it will be appreciated that this is not to be construed as limiting, since such devices may also operate respectively as a multiplexer or demultiplexer when an optical signal is directed through the device in an opposite direction.

Figure 3:
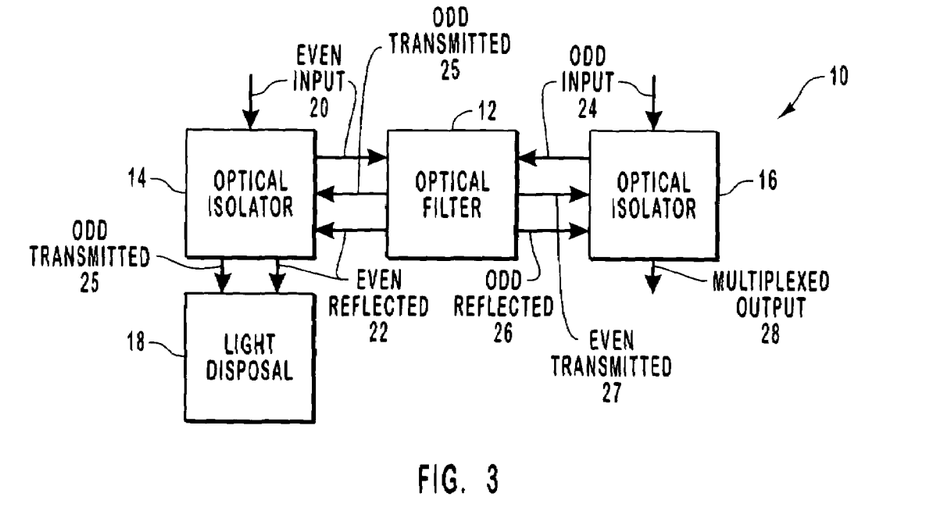
FIG. 3 is a schematic depiction of a multiplexer system according to one embodiment of the invention.

Referring now to the drawings, the drawings only show the structures necessary to understand the present invention. FIG. 3 depicts a multiplexer/demultiplexer system 10 according to one embodiment of the invention which utilizes a filter means such as an optical filter 12, which can be an interference filter. The system 10 provides compensation for optical filter 12, since an optical filter by itself cannot typically achieve the necessary minimum return loss when used as a multiplexer. The system 10 of FIG. 3 demonstrates the manner in which this deficiency can be compensated.

The system 10 has an optical isolation means such as first and second optical isolators 14 and 16, and a light disposal means such as a light disposer device 18, which are used in conjunction with optical filter 12. In one preferred embodiment, the optical isolation means can be a combination of a polarizing beam splitter and quarter-wave plate, which are in optical communication with optical filter 12. Alternatively, the optical isolation function of the isolation means can be achieved by a device that imparts a non-normal incident angle to the input beams. The light disposal means can be, for example, a baffle, or a conveyance which directs the light away from the system in a manner that guarantees it will not contribute to the input or output signals. The conveyance can comprise mirrors, lenses, fibers or waveguides, rhombs or other total internal reflectors, other types of optical components, as well as various combinations thereof.

During operation of multiplexer system 10, even-parity input optical channels 20 are introduced to optical filter 12 through the first optical isolator 14. The optical energy 22 in the even-parity channels inadvertently reflected by optical filter 12 is directed by optical isolator 14 to the light disposer device 18. The odd-parity input optical channels 24 are directed through the second optical isolator 16 to the opposing face of optical filter 12. Odd-parity optical energy 25 that is inadvertently transmitted through optical filter 12 is directed by the first optical isolator 14 to the light disposer device 18. Odd-parity optical energy 26 reflected by optical filter 12 and even-parity optical energy 27 transmitted by optical filter 12 are directed by the second optical isolator 16 to a multiplexed output 28 of the multiplexer system.

Figure 4:
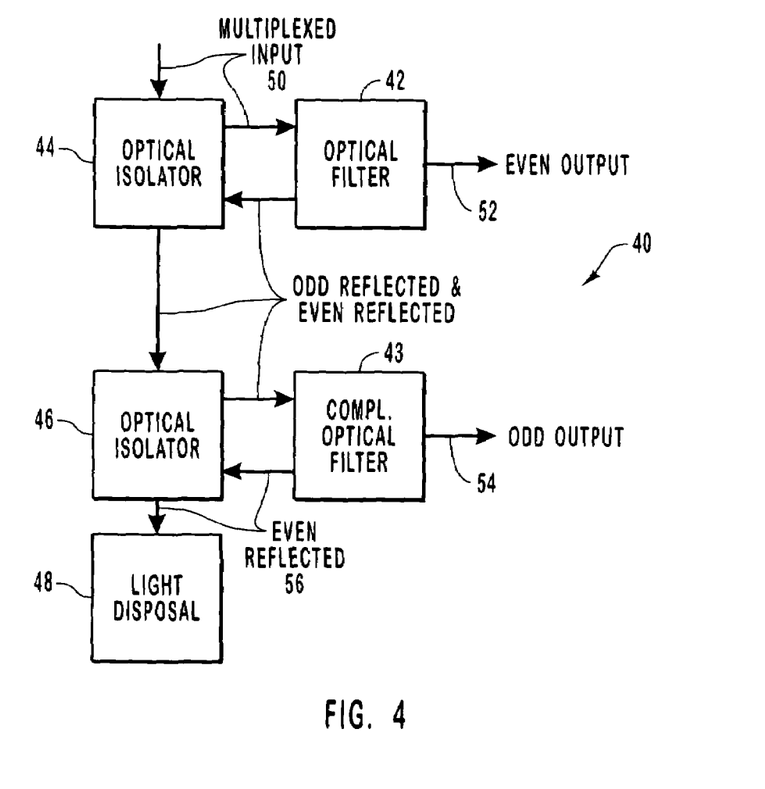
FIG. 4 is a schematic depiction of a demultiplexer system according to another embodiment of the invention.

FIG. 4 depicts a demultiplexer system 40 according to another embodiment of the invention. The demultiplexer system 40 provides compensation for an optical filter, since an optical filter by itself cannot typically achieve the necessary minimum isolation when used as a demultiplexer. The demultiplexer system 40 in FIG. 4 demonstrates the manner in which this deficiency can be compensated.

The demultiplexer system 40 has an optical isolation means such as first and second optical isolators 44 and 46, and a light disposal means such as a light disposer device 48, which are used in conjunction with two complimentary optical filters 42 and 43. The optical isolation means can be a combination of a polarizing beam splitter and quarter-wave plate, which are in optical communication with optical filters 42 and 43. Alternatively, the optical isolation function of the isolation means can be achieved by a device that imparts a non-normal incident angle to the input beams. The light disposal means can be a baffle or a conveyance that directs light away from the system, such as discussed for the embodiment of FIG. 3.

During operation of demultiplexer system 40, multiplexed input optical signals 50 are introduced to the first optical filter 42 through the first optical isolator 44. The majority of even-parity optical energy 52 is passed through the first optical filter 42. It is assumed that the amount of odd-parity energy passed through the first optical filter 42 is negligible. The first optical filter 42 reflects some even-parity optical energy and nearly all of the odd-parity optical energy, which is redirected from the first optical isolator 44 to the second optical isolator 46 and into the second optical filter 43. The second optical filter 43 is designed to compliment the first optical filter 42. The second optical filter 43 principally transmits the odd-parity signals 54 and reflects the even-parity signals 56. The output of the second optical filter 43 contains nearly all of the odd-parity optical energy and a negligible amount of the even-parity energy. Any optical energy reflected by the second optical filter 43 is directed by the second optical isolator 46 into the light disposer device 48. Thus, the demultiplexer system 40 separates the two sets of odd-parity and even-parity optical signals while maintaining the necessary isolation between them.

Figure 5:
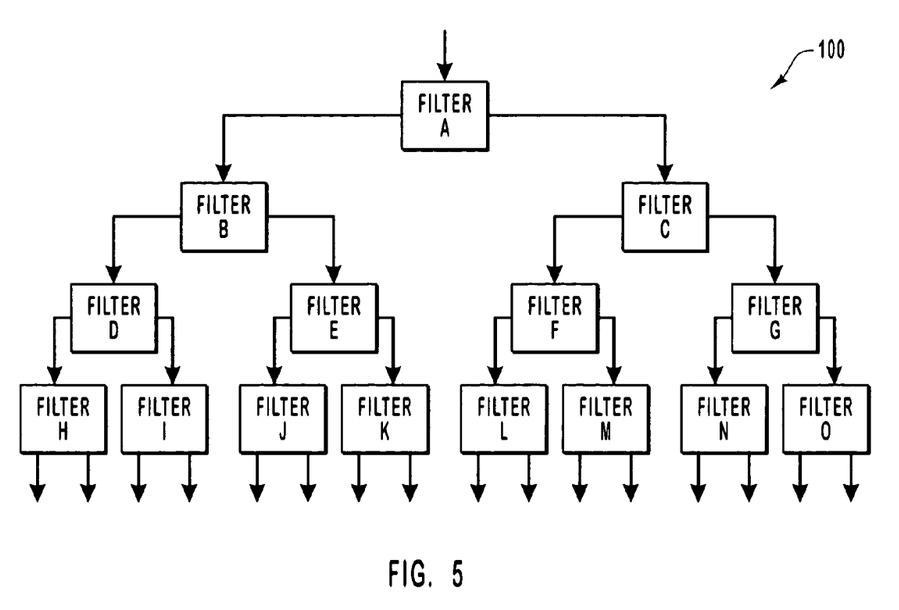
FIG. 5 is a schematic depiction of a tree structure arrangement for multiplexing or demultiplexing stages.

FIG. 5 is a schematic depiction of a tree structure arrangement 100 such as a binary tree for multiplexing or demultiplexing stages using optical filters A-O. Such an arrangement is an effective tool in efficiently combining or separating communication signals. By recursively separating or combining optical signals, each signal need only pass through a limited number, $\log_2 N$, of stages, for N frequencies in the entire communications band. This approach does require N−1 filters, but each path traverses only a limited subset of these.

Figure 6:
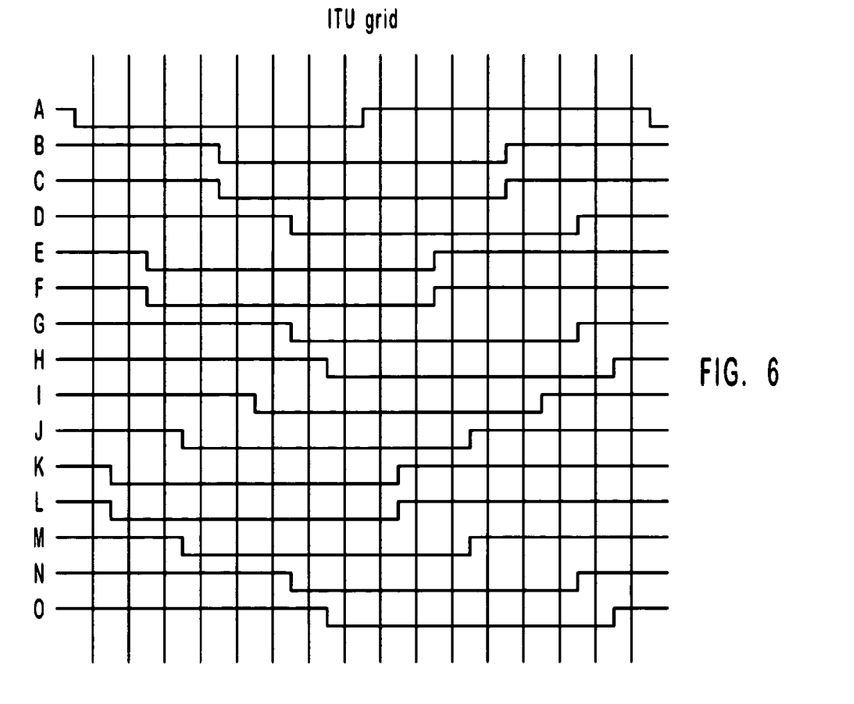
FIG. 6 shows the transmission curves in an ITU grid for a series of filters applied to the tree structure of FIG. 5.

FIG. 6 shows the transmission curves in an ITU grid for a series of optical filters A-O applied to the tree structure of FIG. 5 having nearly identical free spectral ranges but shifted in frequency. The smallest free spectral range (FSR) of this frequency shifted filtering technique can be much larger than the smallest free spectral range of conventional tree-structure systems, thereby reducing optical filter fabrication constraints. The "shifts" are actually achieved by slightly varying the free spectral range of the filters. The transmission window within the communication band represents a high-order mode of interference. That is, the center frequency of the transmission window is a large integer-multiple of the FSR. Say for example the FSR of filter A is 2000 GHz and the center frequency of filter A is 194 THz (1 THz=1000 GHz). The mode number is therefore 194/2=97. If Filter B is to be "shifted" by 1000 GHz, then its FSR should be 1989.7 GHz, so that its center frequency is 97*1989.7 GHz=193 THz. Thus, the FSRs are "essentially" similar, with negligible effects over the communications band.

Figure 7:
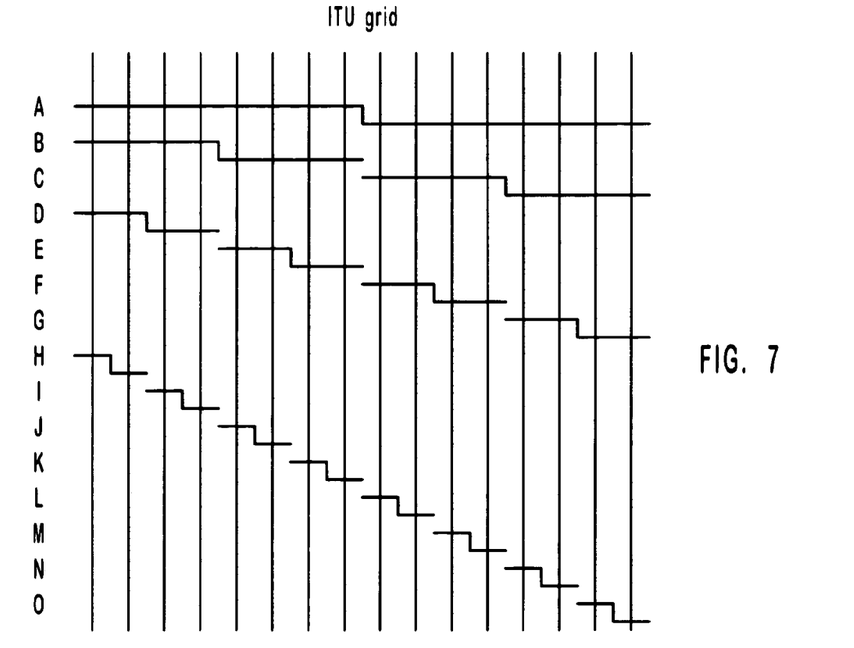
FIG. 7 shows the transmission curves in an ITU grid for a series of filters applied to the tree structure of FIG. 5 in an alternative approach.

FIG. 7 shows the transmission curves in an ITU grid for another approach for a series of filters A-O applied to the tree structure of FIG. 5. As a demultiplexer, the first optical filter A, which is a half-band filter separates the channels into high frequency and low frequency regions. Subsequent optical filters similarly divide their incident frequencies into high and low frequency components. The half-band filters are simply interference filters with very large FSRs, so that only one transition occurs within the communication band of interest.

Although the first filter A functions across the entire communication band, it needs to produce only a single transitional boundary. The problems with dispersion do not apply in this case because there is no repetition of the passband across active channels. The same case holds true for subsequent filters as the active band to be separated is recursively reduced.

Figure 8:
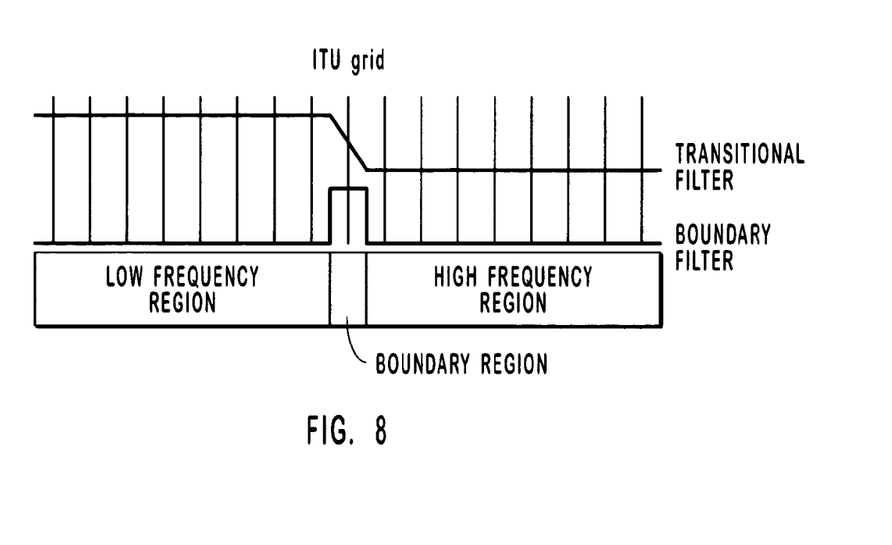
FIG. 8 is a diagrammatic representation of a transitional filtering approach for multiplexing or demultiplexing according to the invention.
Figure 9:
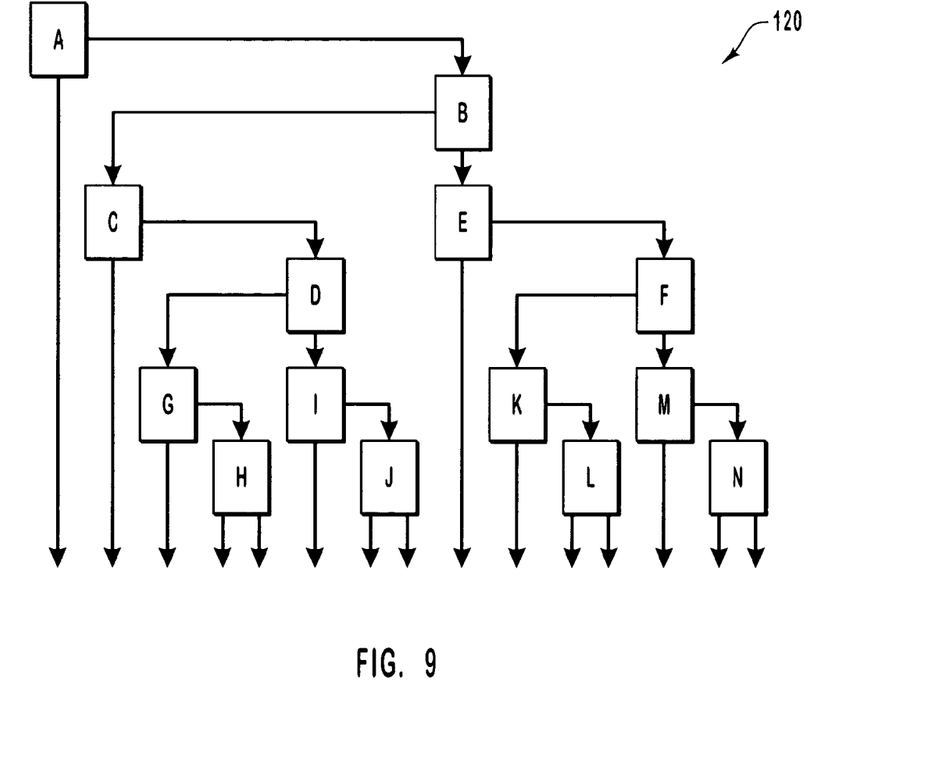
FIG. 9 is a schematic depiction of a modified tree structure arrangement that allows precise demultiplexing or multiplexing with transitional filters according to the invention.
Figure 10:
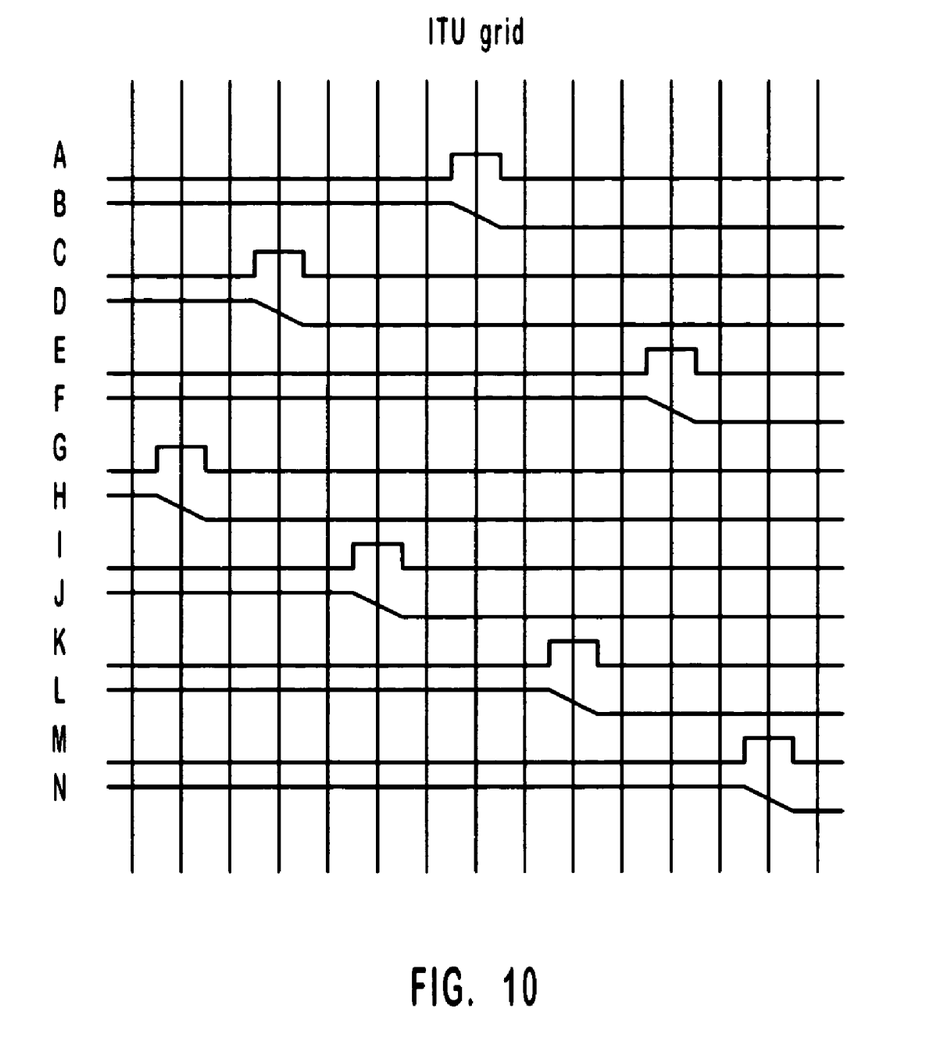
FIG. 10 shows the transmission curves in an ITU grid for a series of filters applied to the modified tree structure arrangement of FIG. 9.

As shown in the diagram of FIG. 8, it may prove true that practical transitional boundaries cannot precisely separate adjacent channels. However, it is practical to design narrow bandpass filters over the transitional region. By first separating the channel or channels corresponding to the transition with a boundary filter such as a narrow bandpass optical filter, a transitional optical filter can then effectively separate the remaining channels. FIG. 9 shows an optical multiplexer/demultiplexer system 120 in the form of a modified tree structure that allows precise demultiplexing or multiplexing with such transitional filters, with the necessary filter transmission curves shown in FIG. 10 in an ITU grid. Again, the requirements on the filters are reduced since the boundary filter needs only to be a narrow bandpass filter and the transitional filters need only produce a single transitional boundary.

In the embodiment of FIG. 9, system 120 comprises a first boundary filter A, a first transitional optical filter B in optical communication with boundary filter A, a second boundary filter C in optical communication with transitional optical filter B, a second transitional optical filter D in optical communication with boundary filter C, and a third boundary filter E in optical communication with transitional optical filter B. Additional transitional and boundary filters F-N can also be present in system 120 as shown in FIG. 9.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical system, comprising:
   an optical filter configured to multiplex and/or demultiplex a first channel and a second channel based on a wavelength of each channel;
   a first optical isolator optically coupled with the first channel;
   a second optical isolator optically coupled with the second channel; and
   a light disposer in optical communication with the first optical isolator and arranged such that the light disposer and first optical isolator collectively define a portion of an optical path associated with the optical filter.

2. The system of claim 1, wherein the optical filter comprises an interference optical filter.

3. The system of claim 1, wherein the first and second optical isolators comprise a polarizing beam splitter and a quarter-wave plate.

4. The system of claim 1, wherein the first and second optical isolators comprise a device that imparts a non-normal incident angle to input light beams.

5. The system of claim 1, wherein the light disposer comprises a baffle or a conveyance.

6. The system of claim 5, wherein the conveyance is selected from the group consisting of mirrors, lenses, fibers, waveguides, rhombs, total internal reflectors, and combinations thereof.

7. The system of claim 1, wherein the system is configured as a multiplexer.

8. The system of claim 1, wherein the system is configured as a demultiplexer.

9. The optical system of claim 1, wherein the light disposer and first optical isolator are arranged such that a signal directed from the optical filter to the light disposer must pass through the first optical isolator.

10. The optical system of claim 1, wherein:
    the optical filter is configured to transmit a majority of energy of the first channel; and
    the optical filter is further configured to reflect a majority of energy of the second channel.

11. The optical system of claim 10, wherein:
    the optical system is configured to direct a portion of the first channel reflected by the light filter to the light disposer; and
    the optical system is configured to direct a portion of the second channel transmitted by the light filter to the light disposer.

12. The optical system of claim 11, wherein the portion of the first channel reflected by the light filter and the portion of the second channel transmitted by the light filter are directed to the first optical isolator before the portion of the first channel reflected by the light filter and the portion of the second channel transmitted by the light filter are directed to the light disposer.

13. The optical system of claim 10, wherein the majority of energy of the first channel transmitted by the optical filter and the majority of energy of the second channel reflected by the optical filter are multiplexed by the optical filter.

14. The optical system of claim 10, wherein the majority of energy of the first channel transmitted by the optical filter and the majority of energy of the second channel reflected by the optical filter are demultiplexed by the optical filter.

15. The optical system of claim 10, wherein the first channel includes even-parity optical signal channels and the second channel includes odd-parity optical signal channels.

16. The optical system of claim 1, wherein the second optical isolator includes a multiplexed output, the first optical isolator includes an even input to receive the first channel, and the second optical isolator includes an odd input to receive the for the second channel.

17. The optical system of claim 1, wherein the optical filter includes an odd input for receiving the second channel from the second optical isolator and an even input for receiving the first channel from the optical isolator.

18. The optical system of claim 17, wherein the optical filter further includes:
    an even transmitted output for transmitting a majority of the optical energy of the first channel transmitted by the optical filter; and
    an odd reflected output for transmitting a majority of the optical energy of the second channel reflected by the optical filter.

19. The optical system of claim 18, wherein the optical filter further includes:
    an even reflected output for transmitting a portion of the optical energy of the first channel reflected by the optical filter; and
    an odd transmitted output for transmitting a portion of the optical energy of the second channel transmitted by the optical filter.

20. The optical system of claim 17, wherein the even transmitted output directs the majority of the optical energy of the first channel transmitted by the optical filter to a multiplexed output and the odd reflected output directs the majority of the optical energy of the second channel reflected by the optical filter to the multiplexed output.

21. The optical system of claim 20, wherein the even transmitted output directs the majority of the optical energy of the first channel transmitted by the optical filter to a multiplexed output through the second optical isolator and the odd reflected output directs the majority of the optical energy of the second channel reflected by the optical filter to the multiplexed output through the second optical isolator.

22. The optical system of claim 20, wherein the even reflected output directs the portion of the optical energy of the first channel reflected by the optical filter to the light disposer and the odd transmitted output directs the portion of the optical energy of the second channel transmitted by the optical filter to the light disposer.

23. The optical system of claim 22, wherein the even reflected output directs the portion of the optical energy of the first channel reflected by the optical filter to the light disposer through the first optical isolator and the odd transmitted output directs the portion of the optical energy of the second channel transmitted by the optical filter to the light disposer through the first optical isolator.

24. An optical system, comprising:
    a means for filtering one or more wavelengths of optical energy based on the wavelengths of the one or more wavelengths of optical energy;
    a first means for isolating one or more optical signal channels;
    a second means for isolating one or more optical signal channels; and
    a means for disposing of one or more optical signal channels received from the means for filtering by way of the first means for isolating.

25. The system of claim 24, wherein the system is configured as a multiplexer.

26. The system of claim 24, wherein the system is configured as a demultiplexer.

27. The system of claim 24, wherein the means for filtering is configured to:

receive even-parity optical signal channels through the first means for isolating; and receive odd-parity optical signal channels through the second means for isolating.

28. The system of claim 27, wherein the means for filtering is further configured to:

transmit one or more of the even-parity optical signal channels to the second means for isolating; and reflect one or more of the odd-parity optical signal channels back to the second means for isolating.

29. The system of claim 27, wherein the means for filtering is further configured to:

reflect one or more of the even-parity optical signal channels to the means for disposing through the first means for isolating; and transmit one or more of the odd-parity optical signal channels to the means for disposing through the first means for isolating.

30. An optical multiplexer system comprising:

a first optical isolator;

a second optical isolator;

a light disposer; and an optical filter configured to:

receive even-parity and odd-parity optical channels from the first and second optical isolators, respectively;

transmit odd-parity optical energy and reflect even-parity optical energy to the light disposer by way of the first optical isolator; and transmit even-parity optical energy and reflect odd-parity optical energy to the second optical isolator.

31. The system of claim 30, wherein the optical filter comprises an interference optical filter.

32. The system of claim 30, wherein each of the first and second optical isolators comprises a device that is configured to impart a non-normal incident angle to input light beams.

33. The system of claim 30, wherein the light disposer comprises a baffle or a conveyance.

34. The system of claim 33, wherein the conveyance comprises a mirror, lens, fiber, waveguide, rhomb, total internal reflector, or any combination thereof.

35. The system of claim 30, wherein one of the optical isolators comprises:

a polarizing beam splitter; and a quarter wave plate.

* * * * *

UNITED STATES PATENT AND TRADEMARK OFFICE
CERTIFICATE OF CORRECTION

PATENT NO.       : 7,340,123 B1
APPLICATION NO.  : 10/684007
DATED            : March 4, 2008
INVENTOR(S)      : Marsden

It is certified that error appears in the above-identified patent and that said Letters Patent is hereby corrected as shown below:

Title Page
Item 56, References Cited, U.S. Patent Documents, change "7,075,712 B2*    7/2006 Kinoshita et al.  ............. 359/649" to --7,075,712 B2*   7/2006  Kinoshita et al.  ............. 359/349--

Column 10
Line 24, change "17" to --19--

Signed and Sealed this

Thirty-first Day of August, 2010

David J. Kappos
*Director of the United States Patent and Trademark Office*